US012600118B2

(12) United States Patent
Veiseh

(10) Patent No.: US 12,600,118 B2
(45) Date of Patent: *Apr. 14, 2026

(54) METHOD FOR ATTACHING INSULATION PANELS

(71) Applicant: Simple Container Solutions, Inc., Rancho Dominguez, CA (US)

(72) Inventor: Charles S. Veiseh, Los Angeles, CA (US)

(73) Assignee: SIMPLE CONTAINER SOLUTIONS, INC., Rancho Dominguez, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/643,701

(22) Filed: Apr. 23, 2024

(65) Prior Publication Data

US 2024/0286395 A1 Aug. 29, 2024

Related U.S. Application Data

(63) Continuation of application No. 17/963,551, filed on Oct. 11, 2022, now Pat. No. 11,999,148.

(Continued)

(51) Int. Cl.
B32B 37/10 (2006.01)
B32B 5/02 (2006.01)
(Continued)

(52) U.S. Cl.
CPC .............. B32B 37/10 (2013.01); B32B 5/02 (2013.01); B32B 5/26 (2013.01); B32B 7/09 (2019.01);
(Continued)

(58) Field of Classification Search
CPC . B32B 37/0015; B32B 37/0038; B32B 37/10; B32B 37/12; B32B 37/16;
(Continued)

(56) References Cited

U.S. PATENT DOCUMENTS 2,862,251 A 12/1958 Kalwaites
3,129,466 A 4/1964 L'Hommedieu
(Continued)

OTHER PUBLICATIONS

Geffertova et al, Recycling of the Hardwood Kraft Pulp, Technical University in Zvolen, Faculty of Wood Sciences and Technology, Mar. 2012, www.intechopen.com, 35 pages.

*Primary Examiner* — John L Goff, II
(74) *Attorney, Agent, or Firm* — DILWORTH IP, LLC

(57) ABSTRACT

A method for connecting insulation panels, each of the panels comprising a cellulosic web having two sides and an outside edge, and comprising layers of cellulosic fibers, the method comprising:

arranging a portion of each panel to be adjacent to the other, thereby forming an edge portion where the two webs can be connected;

relaxing the fibers of cellulosic material in the edge portion of each insulation panel by applying heat to the edge portion at a temperature of 150° F. to 450° F., thereby forming a relaxed fiber edge portion;

compressing the relaxed fiber edge portion of each insulation panel at a pressure of at least 5 psig, thereby forming a compressed panel portion having a thickness and a density; and fastening the compressed panel portions together using sewing, riveting, adhesive, tape, interlacing, stamping, ply bonding or stapling thereby forming a fastened area, wherein step (c) can be conducted at the same time or following step (b).

4 Claims, 8 Drawing Sheets

Related U.S. Application Data

(60) Provisional application No. 63/272,742, filed on Oct. 28, 2021.

(51) Int. Cl.

| | |
|---|---|
| *B32B 5/26* | (2006.01) |
| *B32B 7/09* | (2019.01) |
| *B32B 7/12* | (2006.01) |
| *B32B 29/02* | (2006.01) |
| *B32B 37/12* | (2006.01) |
| *B32B 37/16* | (2006.01) |
| *B32B 38/00* | (2006.01) |

(52) U.S. Cl.
CPC ............... *B32B 7/12* (2013.01); *B32B 29/02* (2013.01); *B32B 37/12* (2013.01); *B32B 37/16* (2013.01); *B32B 38/0036* (2013.01); *B32B 2038/008* (2013.01); *B32B 2262/04* (2013.01); *B32B 2305/10* (2013.01); *B32B 2307/304* (2013.01); *B32B 2307/718* (2013.01); *B32B 2307/732* (2013.01); *B32B 2309/02* (2013.01); *B32B 2309/04* (2013.01); *B32B 2309/12* (2013.01); *B32B 2317/12* (2013.01); *B32B 2317/18* (2013.01); *B32B 2607/00* (2013.01)

(58) Field of Classification Search
CPC ...... B32B 2038/0056; B32B 2038/006; B32B 2038/008; B32B 2038/0048; B32B 5/02; B32B 5/26; B32B 7/09; B32B 7/12; B32B 29/02; B32B 29/005; B32B 29/06; B32B 38/0036; B32B 2262/04; B32B 2305/10; B32B 2307/304; B32B 2307/718; B32B 2307/732; B32B 2309/02; B32B 2309/04; B32B 2309/12; B32B 2317/12; B32B 2317/18; B32B 2607/00; B32B 2250/26; B29C 65/62; B29C 65/48; B29C 66/0242; B29C 66/026; B29C 66/028; B29C 66/342; C09J 5/02; B65B 51/02–08; B42B 2/00; D06C 3/065; B31B 70/60–68
USPC .......................................... 156/93
See application file for complete search history.

(56) References Cited

U.S. PATENT DOCUMENTS

| | | | | | |
|---|---|---|---|---|---|
| 6,063,717 | A | * | 5/2000 | Ishiyama | ................. D04H 5/03 428/113 |
| 11,999,148 | B2 | * | 6/2024 | Veiseh | ...................... B32B 5/26 |
| 2009/0246447 | A1 | * | 10/2009 | Luo | ....................... A61F 13/534 156/292 |
| 2020/0231365 | A1 | | 7/2020 | Veiseh | |

* cited by examiner

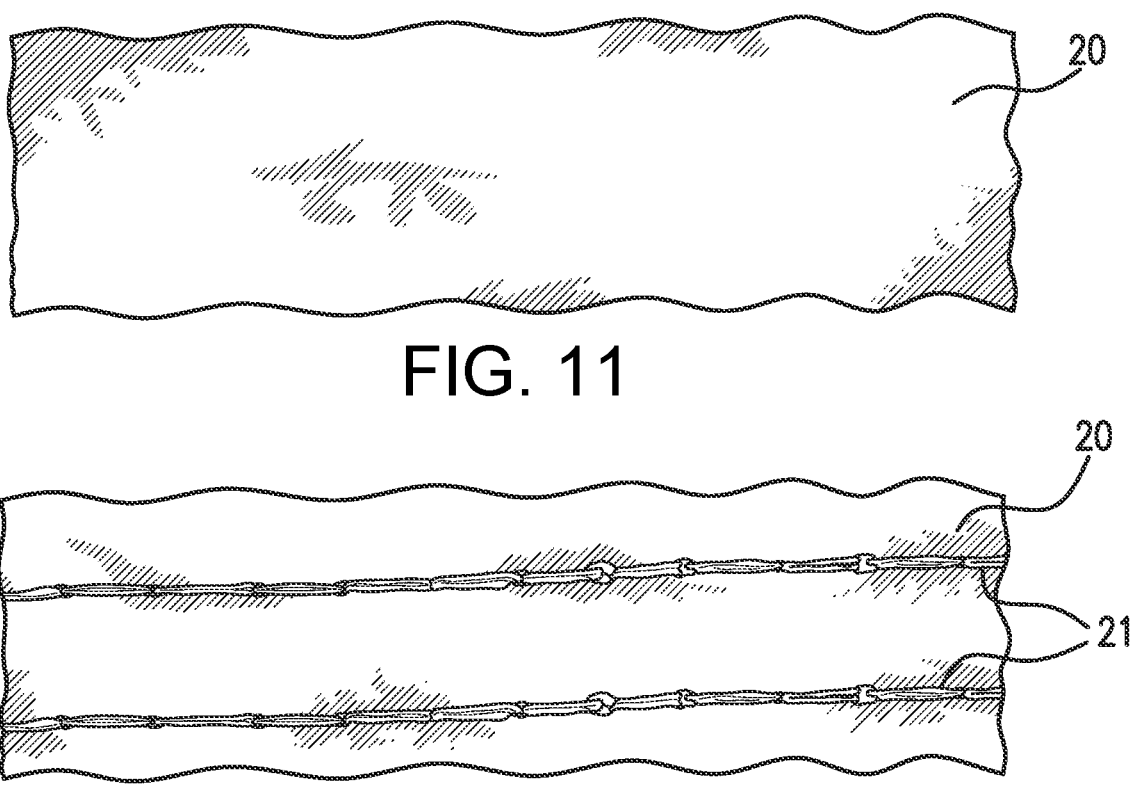
FIG. 11
FIG. 12
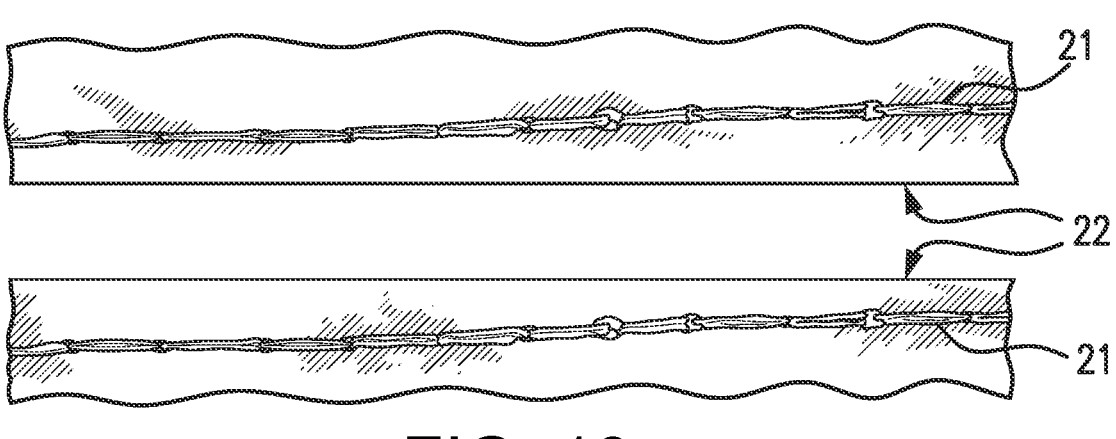
FIG. 13

METHOD FOR ATTACHING INSULATION PANELS

FIELD OF THE INVENTION

The present invention describes an improved method of connecting insulation panels. In particular, the present invention relates to connecting cellulose insulation panels in a process using compression and heating prior to fastening.

BACKGROUND

Insulation materials such as multi-layer tissue, tend to be lofty and relatively low density when compared to film and paper materials, such as plastic films or ordinary copy paper that can be heat sealed or glued, respectively. This presents several challenges when multi-layer tissue materials are utilized to manufacture protective packaging with connected panels in a system that is temperature controlled.

Also, when compared to traditional woven or knit textiles such as cotton, nylon, rayon, polyester or a mixture of different textile fibers and yarns, relatively lofty and fragile multi-layer tissue insulation materials are easily damaged by the sewing apparatus, and when thicker varieties are used, the sewing apparatus may have difficulty penetrating and maneuvering through the variety of necessary directions to produce an end product.

The current commercial state of the art for connecting insulation panels, e.g., panels used to protect the interior of a six sided shipping box or flat insulated shipping mailers, include: (1) connecting insulation panels up to ⅛" thick using an adhesive; (2) using pre-segmented panels along with sealable film or paper material; (3) sewing the film or paper with thread; or (4) using a substrate, and connecting the panels edges with adhesive tape or non-adhesive substrates (strips of material) or combination thereof. Pre-segmented panels present challenges when used to manufacture box liners that require using multiple webs of material in a stacked fashion, or those that are improved by continuous production of connected panels of insulation material. In addition, the connecting and sewing methods mentioned present challenges when the insulation panel structure being connected are ⅛" thick or greater per panel layer since the multilayer structure tends to resist connection. The difficulty to connect such panels increases with increasing thickness.

When sewing to connect two panels of insulation material, such as webs of multi-layer cellulosic tissue covered on top and bottom with paper material, increased pressure must be applied in the area being connected to compress the materials and properly apply a stitch. The increased applied pressure and resulting friction, generally applied by a presser foot, can result in excess puncturing and tearing of the surface, arising from the pressure and action of the needle or other components of the apparatus while sewing. In such a process, both multilayer tissue and tissue covered in paper can be damaged, since the hardware, puncturing needle and quick movements of the sewing apparatus can cause excess tearing. Thick lofty material can "bunch up," and otherwise resist movement through the sewing head, which can also result in mechanical failure of the sewing needle.

To reduce such damage, the sewing of cellulosic material and other lofty insulation therefore requires slower speeds and reduced pressure on the material. This reduced pressure typically results in a weaker and/or poorly arranged connecting stitch, and slower speeds leading to reduced productivity. The poor and loose connection can also result in a joint that may result in gaps with reduced insulation value and poorer performance of articles manufactured. In addition, even with a slower connecting speed, sewing thick, lofty material creates a sort of 'valley' indent on the material at the location of the stitch, especially when using thicker materials such as those measuring ½" thick for each layer or greater. This type of stitch can be unsightly or too industrial in appearance as compared to other packaging products, such as thermoplastic bubble mailers and padded envelopes, that present a very flat and symmetric tab at their edges where they are connected.

As a result of such challenges in applying a secure, strong connection quickly that does not damage the material or is unsightly, insulation panels such as cellulosic insulation (tissue or paper) or textile fiber-based insulation (using cotton or synthetic fibers) are typically difficult to efficiently produce without damage.

BRIEF DESCRIPTION OF THE DRAWINGS

The subject matter of the present disclosure will be more fully understood from the following detailed description, taken in connection with the accompanying drawings, in which:

FIG. 11 shows an overhead view of a cellulosic web to be connected to bottom layer by sewing along its centerline.

FIG. 12 illustrates the overhead view of FIG. 11 where a double stitch has been applied.

FIG. 13 illustrates the double-stitched cellulosic web of FIG. 12 which has been cut through the middle between the stitches to create two edges.

SUMMARY OF THE INVENTION

Figure 1:
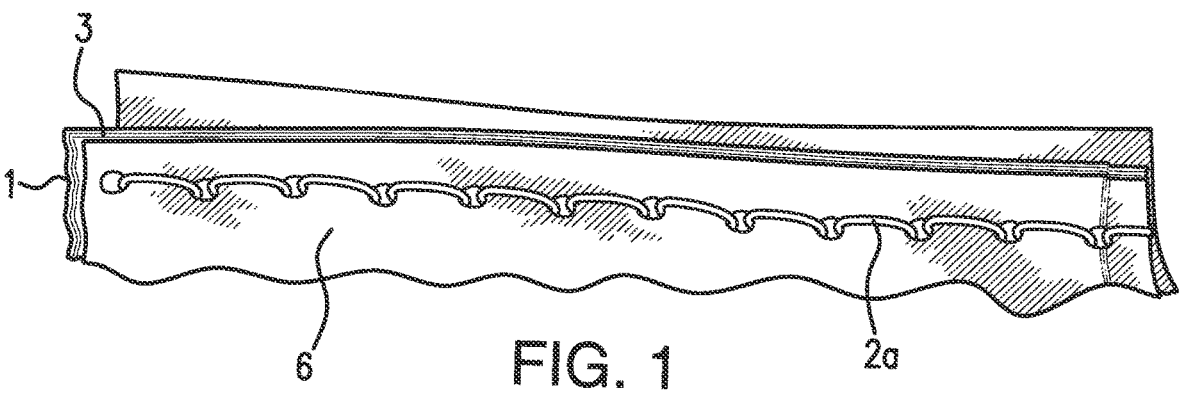
FIG. 1 shows a back-side stitch line for a cellulosic web that was relaxed & compressed.

The subject matter of the present disclosure relates to a method for connecting insulation panels.

In one embodiment, the present disclosure provides a method for connecting insulation panels, each of the panels comprising a cellulosic web having two sides and an outside edge, comprising layers of cellulosic fibers, the method comprising: (a) arranging a portion of each panel to be adjacent to the other, thereby forming an edge portion where the two webs can be connected; (b) relaxing the fibers of cellulosic material in the edge portion of each insulation panel by applying heat to the edge portion at a temperature of 150° F. to 450° F., thereby forming a relaxed fiber edge portion; (c) compressing the relaxed fiber edge portion of each panel at a pressure of at least 5 psig, thereby forming a compressed panel portion having a thickness and a density; and (d) fastening the compressed panel portions together using sewing, riveting, adhesives, tape, interlacing, stamping, ply bonding or stapling, thereby forming a fastened area, wherein step (c) can be conducted at the same time or following step (b). For the purposes of this application, an edge portion can mean any area between the material edge and a centerline of the article that is at most $\frac{1}{3}^{rd}$ the total width of the article. Also, the term adhesives means any material that facilitates the adhesion of the materials together, such as waxes or other materials that facilitate bonding. For the purposes of this invention, the described edge connection methods can apply to the opposite edges of a single web of multilayer cellulosic material that is folded with the edges brought together for connecting. This is shown, for example in FIGS. 6-10, where a single web is folded up upon itself, where the two side edges are connected following heating and/or compression as described, and the bottom is the fold in the folded material. In another embodiment, shown in FIGS. 15-17, a single web is rolled upon itself so that one edge overlaps another edge. The rolled, overlapping edge is then connected following heat and/or compression as described. One of the side edges is then similarly connected following heating and/or compression as described.

When adhesives are utilized, a preferred method is to apply them at connection areas on interior layers that correspond to the edge portion. Adhesives, in particular, hot melt adhesives, can be applied in lanes, e.g., on a moving web or on segmented portions of material at edge portions that are to be connected. Adhesives may also be used to connect other portions of the web that must be connected for the purposes of creating the article. When thicker insulation end products are desired, this method can be applied to webs of the multi-layer tissue before they are combined in stacked fashion. An adhesive is pre-applied at edge portions to facilitate the connection of the layers of material at the edge portion. After it is applied on the pre-combined material, the adhesive can either solidify or create an incomplete connection of the combined adjacent layers of tissue. Then, after combining the desired number of layers of tissue, heat is applied to the same edge portions or other portions desired, to create a connection there. As this heat is applied, pressure can also be applied simultaneously with the heat or thereafter. The applied heat and pressure can re-melt and spread the adhesive throughout the layers of stacked tissue to create a cohesive bond and attaching the layers together.

Although the above connection method is useful for connection points such as seams on bags and pouches as well as for edges that must be cohesive such as the edges on the open mouth of an article, this method can also be utilized to attach the desired heavier outer paper layers to the combined web and these paper layers serve as the inner and outer surface of the manufactured article. In fact, when heavier outer layers of paper are utilized, the adhesive can optionally be applied only to those paper layers, and such adhesive can serve as the method of connection after heating and compression.

In another embodiment, the present disclosure provides a method for connecting insulation panels, the panels comprising a textile fiber web having two sides and an outside edge, the method comprising: (a) arranging a portion of each panel to be adjacent to the other, thereby forming a edge portion where the two webs can be connected; (b) relaxing the fibers of fiber material in the edge portion of each insulation panel by applying heat to the edge portion at a temperature of 150° F. to 450° F., thereby forming a relaxed fiber edge portion; (c) compressing the relaxed fiber edge portion at a pressure of at least 5 psig, thereby forming a compressed panel portion having a thickness and a density; and (d) fastening the compressed panel portion by sewing, hydrogen bonding, riveting, gluing, taping, fiber to fiber bonding, interlacing, stamping, ply bonding or stapling, wherein step (b) can be conducted at the same time or following step (c).

A cooling step that preferably lowers the temperature of the area heated and relaxed to less than 150° F., preferably using a liquid cooled metal press bar, may be required to cool the structure and therefore not heat/interfere with the sewing apparatus. Such a cooling step while pressure is applied may be more necessary when using higher heating temperatures. Pressure applied, with or without cooling at the same time helps to maintain the closure and is helpful to high speed connecting.

An alternative connecting method is to apply more than one connection to two or more insulation panels and subsequently cut between the two connections in order to create two edges. This method allows two articles to be manufactured simultaneously. These are illustrated in FIGS. 11 through 13, where FIG. 11 illustrates an overhead view of a cellulosic web to be connected by sewing along its centerline. FIG. 12 illustrates the overhead view of FIG. 11 where a double stich has been applied. FIG. 13 illustrates the double-stitched cellulosic web of FIG. 12 which has been cut through the middle between the stitches to create two free edges.

DETAILED DESCRIPTION OF THE INVENTION

The subject matter of the present disclosure provides an improved method to connect two or more insulation panels comprising cellulosic webs with reduced damage, a strong bond and improved cosmetic appearance. The number of layers for each web preferably ranges between 5 and 100, but can multiply depending on how many webs are oriented on top of each other before connecting. Most preferably, 10 to 80 layers for each web are connected.

Specifically, the method includes preparing the location of the material to be stitched by applying combinations of the following: heat, compression, moistening, rapid drying, or any combination of such treatments. The effect of such preparation, more typically heat, combined with compression or heat with subsequent compression, results in a flattening and a typically strengthened structure due to reduction in space between the layers and the grouping of fibers into a more compressed, densely packed arrangement. Such a structure is more suitable for sewing due to the more compact, dense nature of the material. Specifically, the stitching action is facilitated by allowing tighter looping and knotting of the applied thread or stitching material. This tightening provides a stronger mechanical connection than that applied to a non-prepared, looser insulation structure that would result in a mechanically weaker stitch due to looser knotting and/or looping.

The improved connection method results in a connected area that is maintained in a strengthened format by the stitching, and presents markedly higher shear strength than the uncompressed form while serving as a durable connection point. In addition, such a structure is typically flat and uniform in appearance and therefore more cosmetically appealing.

The stitch itself has no flaws when the structure is layered and compressed. The sewn connection, sometimes referred to as a "knitted connection" is clean with no visible signs of stress or unwanted tearing/punctures on either the unbleached paper or tissue. The sewn connection is strong and does not come apart with force applied to the thread. There is also no force needed to run the structure through a belt-fed knitting machine. When stitching unheated and uncompressed structures, stitching is not only flawed but can prove impossible most of the time. Crumpling occurs constantly, causing the sewing head to misalign with the desired trajectory and veer off course. If the knit is stitched through the whole structure, the knitting is easily destroyed by slight tension on the thread. The unbleached paper top layer can be torn and crinkled as the needle fails to puncture through all layers while the belt continues to feed material to the sewing head. Jamming is also a constant issue.

A typical design for accomplishing the desired compressed structure in preparation for sewing can be upper and lower pneumatic or hydraulic heated metal bars that heat and compress the material in the path of the sewing head for manual sewing of individual panels of an article, or in an automated sewing process involving two or more webs of insulation material.

Additionally, a rolling heated wheel can be employed, ideally in the path of the sewing head. The use of steam, needles to puncture and penetrate the inner layers of insulation and to apply steam while applying pressure or subsequent pressure can facilitate the rapid compression of the fibers or layers of the insulation material.

When cellulosic materials are considered, they present high heat resiliency, and therefore can be quickly formed into an unexpectedly strong structure using increased temperatures in the range of 430-445° F. and pressures of 140 psi for application of a stitch.

Relaxation & Compression

In one embodiment, the present disclosure provides a method for connecting insulation panels, the panels comprising a cellulosic web, the cellulosic web having two sides and comprising layers of cellulosic fibers, the method comprising: (a) relaxing the fibers of cellulosic material in the insulation panel by heating the panel portion, at a temperature of 150° F. to 450° F., to form a relaxed fiber edge portion between ⅛" to 2" wide. Preferably, the relaxed, fiber edge portion is heated from 200° F. to 450° F. More preferably, the panel is heated from 300° F. to 450° F. Most preferably, the panel portion is heated from 400° F. to 450° F. Either concurrent with, or subsequent to the heating, the relaxed panel portion is typically compressed at a pressure of at least 5 psig, at least 10 psig or at least 20 psig, thereby forming a compressed panel portion. Preferably, it is compressed at a pressure of 5 to 150 psig. More preferably, the compression is conducted at 20 to 150 psig, and even more preferably, 50 to 150 psig. An uncompressed panel portion preferably has a density of 0.081 g/cm³ to 0.162 g/cm³. Preferably, the compressed panel portion has a density above that starting from 0.468 g/cm³ to 0.680 g/cm³. The compression step can be performed concurrently with the heating step or following it. Heating can be applied on one or both sides of the structure and will preferably take 0.5 seconds to 5 seconds, most preferably the heat will be applied for between 1 and 3 seconds.

The relaxation step can also include wetting the cellulosic material. When it is to be wetted, the cellulosic web is preferably moistened by spraying liquid onto the cellulosic web at a level of 0.5 to 2 lb water/lb cellulosic web along the edge to be connected. More preferably, the web is moistened by spraying liquid onto the cellulosic web at a level of 0.5 to 1.5 lb water/lb cellulosic web. Even more preferably, the level is 0.5 to 0.75 lb water/lb cellulosic web.

Connecting the Panels

Because fabric thicknesses above 0.25 inches are difficult to properly fasten together, relaxation and compression of the fabric as described above greatly facilitates the fastening procedure. After relaxation and compression, the panels can preferably be fastened together by taping, sewing, riveting, gluing, stamping, ply bonding and interlacing. Stamping is performed using a three-dimensional pattern that is applied to the material typically using metal rollers, with ample pressure to create a fiber to fiber bond. Interlacing includes using a punch to create a weaving of the layers together, in a downward stroke. Ply bonding relates to forming a pressure bond between layers of web when the layers are put through rollers, and an engraver puts high pressure on parts (a pattern) of the layers and they bond together as a result. More preferably, the insulation panel is fastened by sewing. Preferably, sewing is conducted by using a chain stitch at a rate of 5 to 37 linear ft/min. Speeds above 37 ft/min may damage the material being connected and below 5 feet per minute create production inefficiency. Preferably, the thickness of the compressed, relaxed panel is at least 60% lower than the panel before relaxation and compression. More preferably, the thickness of the compressed, relaxed panel is at least 70% lower than the panel before relaxation and compression. Even more preferably, the thickness of the compressed, relaxed panel is at least 80% lower than the panel before relaxation and compression.

When taping is utilized, adhesive paper or other such as tape used for securing shipping boxes can be used. A paper tape with water-based adhesive, water soluble adhesive or hot melt adhesive tape is preferred. A starch based adhesive paper tape is used where the adhesive requires moistening before affixing to the edge. Most preferably, a tape where the hot melt adhesive is applied during production is utilized. A tape can also be fashioned utilizing paper or other strips of paper material that when adhesive is applied facilitate a bond and serve to fasten the edges together.

Cellulosic Materials Of Construction

The cellulosic web used in the insulating panels comprises multiple layers of cellulosic fibers. Examples of such layers of cellulosic fibers include paper or paper tissue material, or cellulose-wadding and creped paper, also known as Custom Wrap™ wadding commercially available from Sealed Air Corp. or Versa-Pak™ cushioning products commercially distributed by NPS Corp. of Green Bay, Wisconsin. Preferably, the materials of construction are multiple connected layers, preferably of unbleached tissue. More preferably, the multi-layer materials of construction are creped, embossed or wrinkled. Multi-layer tissue of the same can be utilized.

Also, textile fiber-based insulation manufactured using bonding of textile based fibers including cotton can be utilized to protect a system against outside temperatures. An example of such materials is thermal insulation panels manufactured by Carolina Nonwovens of Maiden, North Carolina. Textile based insulators are excellent insulators but present similar challenges when attempting to connect panels of the same. Insulation panels between 1%" to 2" thick are considered.

There are many similarities in material behavior, i.e., fiber relaxing due to heat, moistening and pressure and any combination of the same, between the cellulosic tissue-based insulators and textile fiber based insulators, therefore the same techniques can be utilized to facilitate connecting panels of the same.

When considering cellulosic materials, preferably, the cellulosic materials are recyclable and compostable, as defined below. More preferably, they are fully recyclable. Most preferably, they are perfectly recyclable. The term recyclable means greater that 50 wt % of the material is recyclable, based on the total weight of the liner. The term fully recyclable means that essentially all (i.e., greater than 90 wt %) is recyclable. The term perfectly recyclable means that 100 wt % of the material is recyclable. For the purposes of this specification, the term recyclable refers to the recycling process for cellulose-based materials such as paper, paper products or tissue. Thus, to be recyclable, the material must be paper, paper products or tissue, must be generally re-pulpable, i.e., water soluble in the repulping process, and can be biodegradable and compostable. Preferably, to be recyclable, the material should have fiber qualities meeting particular dimension requirements as described below.

The web of cellulosic material can be formed from the combining and connecting of multiple layers of cellulose-based tissue materials that are themselves manufactured in a tissue manufacturing process, using mechanical treatment that includes crimping, embossing, gluing, stamping and connecting. Preferably, a tissue paper manufacturing process is utilized that creates a wrinkling in the individual layers of tissue or any other method of creating voids or air pockets in between the layers. Tissue layers manufactured by either method can be later combined and attached to one another to provide insulative properties, so that while compared to non-wrinkled or flat tissue, the treated tissue provides superior insulation. Another method of improving the insulating value of the combined material is to subject unwrinkled finished dry tissue in web, work-in-process or finished article form, to a wrinkling process including re-moistening and heating, or drying, chemical wrinkling, moistening and cooling, or the use of two or more of these processes. Preferably, the tissue paper is produced by combining tissue material that is creped while it is manufactured. Since tissue paper tends to demonstrate high liquid absorbency that can weaken or soil the article, articles manufactured using it can be improved by adding a layer of heavier weight, smoother texture paper material or other material with lower liquid absorbency. Such layers can be applied during the manufacturing of the multilayer tissue process, while such material is applied to one or both surfaces of the material. Materials with less absorbency can also be added during the conversion process of protective system articles such as insulating liner and connected to desired sides of the bag then.

Preferably, the liner described above is manufactured using cellulose materials such as kraft or unbleached natural colored tissue, or bleached tissue. Lighter colored papers and metalized papers including covering layers may provide reduced heat absorption properties in some applications and therefore provide superior protection against heat. The primarily paper construction when used in conjunction with water-soluble adhesives yields a liner that is largely recyclable where recyclers use a process that first creates a pulp material that is later turned into more paper materials. Less processed cellulose materials are preferred in that they consist of longer cellulose fibers that are more desirable to recycling facilities. For the purpose of this specification, the term less processed cellulose materials means cellulose material that has been through one or fewer recycling processes. Longer cellulose fibers provide greater strength to products manufactured using them, and are therefore more desirable for and graded higher by recyclers. Comparatively, products made using macerated newsprint which consists of shorter fiber cellulose material are of lesser value when graded by recyclers and are possibly sent to landfills instead of being recycled. Preferably, to be recyclable, the average fiber length of the pulped fiber is 0.7 to 3.2 mm. More preferably, the average fiber length of the resultant pulped fibers produced in the recycling process is from 0.824 to 3.2 mm. When the pulped fiber is tissue material, the average fiber length of the pulped fiber is more preferably from 1.0 to 3.2 mm. When the pulped fiber is not tissue material the average fiber length is more preferably from 0.824 to 0.744 mm. To be recyclable, preferably, the average fiber width of the pulped non-tissue fibers are from 20.8 to 19.8 µm, and preferably, the fiber shape factor of the pulped non-tissue fibers is from 90.1 to 89.3. The average fiber length, average fiber width and fiber shape factor are as described in Recycling of the Hardwood Kraft Pulp, Geffertova et al, Technical University in Zvolen, Faculty of Wood Sciences and Technology, March 2012, www.intechopen.com, p 270-275.

Although cellulose tissue materials are natural insulators due to their constitutive fiber's low heat conductivity, multiple layers of tissue are preferred in that they provide multiple air pockets between such layers that further slow the transfer of heat through sheets or panels made of the same. In the preferred creped form, even more air pockets are contained that further retard heat flow resulting in enhanced insulation performance. Here, heat flow indicates flow from one side of a layer of the tissue or multiple layers to the other side, i.e. through a top layer to the other side bottom layer and out.

The cellulosic web preferably is manufactured from layers of cellulosic material where each tissue layer has a weight from 15 to 60 grams/sq meter and wherein the paper cover layer has a weight from 30 to 170 grams/sq meter.

Still another embodiment discloses a methods A method for connecting insulation panels, each of the panels comprising a cellulosic web having two sides and an outside edge, and comprising layers of cellulosic fibers, the method comprising arranging a portion of each panel to be adjacent to the other, thereby forming an edge portion where the two webs can be connected; compressing the relaxed fiber edge portion of each insulation panel at a pressure of at least 5 psig, thereby forming a compressed panel portion having a thickness and a density; and fastening the compressed panel portions together. As an alternative method to prepare the edges for connection, mechanical pressure can be used such as line embossing using steel grooved rollers that pinch and apply pressure to the cellulose structure between another steel roller. Specifically, such grooved rollers or non-grooved rollers can be positioned to apply compression to the edges of a web in preparation for the connection of the edges together. When considering a structure where the number of layers does not exceed one 30 lb to 40 lb paper cover layer attached to between one to five 9 to 11 lb. tissue layers, mechanical pressure without heat can adequately prepare edge sections for connecting. More layers of paper or tissue can be prepared as such with the help of liquid adhesives used for the connection such as starch based, hot-melt or other liquid adhesives and these liquids can further aid in the fiber relaxing process when the moistening is in the range of 0.5 to 2 lb liquid/lb of the cellulose material.

The following Examples further detail and explain the performance of the described connection method. Those skilled in the art will recognize many variations that are within the spirit of the invention and scope of the claims.

EXAMPLES

Example 1: Pressure Compression Ranges

The seal thickness of cellulosic material was tested at 445° F. and various pressures. Using an Aline HD60 sealer and a 5"×4" structure composed of 88 layers of cellulosic material and 4 layers of kraft paper, the following data was gathered. Results of the test work are summarized in Table 1.

TABLE 1

| Seal Thickness (cm) | Pressure (psi) | Temperature (F.) |
|---|---|---|
| 1.465 | 20 | 445 |
| 1.105 | 40 | 445 |
| 0.769 | 50 | 445 |
| 0.724 | 60 | 445 |
| 0.665 | 80 | 445 |
| 0.576 | 100 | 445 |
| 0.511 | 110 | 445 |
| 0.500 | 120 | 445 |
| 0.427 | 140 | 445 |

Example 2: Pressure & Temperature Requirements

The test determined the minimum amount of pressure and heat needed in the current sealer to make a permanent compression of the cellulosic material. Using an Aline HD60 sealer and a 5"×4" structure composed of 88 layers of cellulosic material and 4 layers of kraft paper, the following data was gathered. Results from the test work are shown in Table 2.

TABLE 2

| Untreated Seal Width: 2.263 cm | | |
|---|---|---|
| Pressure (psi) | Seal Thickness (cm) | Temperature (F.) |
| 20 | 2.263 | N/A |
| 40 | 2.263 | N/A |
| 50 | 1.437 | N/A |

The minimum compression without heat appears to be 50 psig. Similarly, the minimum temperature required to form an adequate seal at 20 psig was found to be 127° F.

Example 3: Cellulosic Material Absorbency

The test determined the amount of liquid required to wet the cellulosic material to relax the material. 0.29 lbs. of cellulosic material is submerged into a volume of water containing 36.48 lbs. of water. After being submerged for enough time (until the water molecules have settled into the fibers), the cellulosic material is placed on a wire mesh acting as a lid for the volume of water—allowing excess water to drip back into the volume to be measured until water stops leaking. Mass measurements were measured using an ES-PS01 Dr. Meter scale. Results are shown in Table 3.

TABLE 3

| | LBS |
|---|---|
| Water Tank (Pre-soak) | 36.48 |
| Water Tank (Post-soak) | 34.47 |
| Cellulosic material (Pre-soak) | 0.29 |
| Cellulosic material (Post-soak) | 2.19 |

Both the tank volume and cellulose material mass are measured to measure the percent difference between the two final values. The equations below find the difference between two masses to find out the water absorbed and divide them against the original mass of the unsoaked cellulose material.

$$\frac{[\text{Water Tank(Pre} - \text{soak}) - \text{Water Tanks(Post} - \text{soak})]}{\text{Cellulosic material(Presoak)}} =$$

$$\frac{36.48 - 34.47}{0.29} = 6.93 \frac{\text{lbs. of water}}{\text{lb. of CelluLiner}}$$

Example 4: Measuring Seal Density of Compressed & Heated Cellulosic Material The test determined how the density of a portion of compressed & heated cellulosic material structure increases as more heat is added amount of liquid required to wet the cellulosic material to relax the material. Using an Aline HD60 sealer and a 5"×4" structure composed of 88 layers of cellulosic material and 4 layers of kraft paper, the following data was gathered. Vernier calipers were placed on the corner cubic inch of piece of Cellulosic material to measure thickness, and the structures are heated at different temperatures using the same pressure on the heat bar. Tables 4-6 list measurements on the cellulosic material, test conditions and seal properties as a function of temperature. Seal density versus temperature data is shown in Table 6.

TABLE 4

| Seal Width | 3/4" |
|---|---|
| | (1.905 cm) |
| Seal Mass | 5 g |
| Total Mass | 27 g |
| Pressure | 140 psi |
| Untreated Seal Thickness (cm) | 2.544 |
| Untreated Seal Volume (cm³) | 61.548 |
| Untreated Seal Density (g/cm³) | 0.081 |

TABLE 5

| Untreated Seal Thickness (cm) | Untreated Seal Volume (cm³) | Untreated Seal Density (g/cm³) |
|---|---|---|
| 2.544 | 61.548 | 0.081 |

TABLE 6

| Temperature (C.) | Seal Thickness (cm) | Seal Volume (cm³) | Seal Density (g/cm³) | Relative Density |
|---|---|---|---|---|
| 400 | .442 | 10.694 | 0.468 | 578% |
| 410 | .411 | 9.944 | 0.503 | 621% |
| 430 | .386 | 9.339 | 0.535 | 660% |
| 440 | .357 | 8.637 | 0.579 | 715% |
| 445 | .330 | 7.984 | 0.626 | 773% |
| 450 | .304 | 7.355 | 0.680 | 840% |

Example 5: Sewing Conditions

The test determined the ability to sew the cellulosic material that has been heated and compressed compared to that which has not. Using a Model 100 Empress Series Sewing Head and a 5"×4" structure composed of 88 layers of cellulosic material and 4 layers of kraft paper, the following data was gathered.

A sewing machine was used to sew across the length of pieces of cellulosic material structures that are treated and untreated to show the differences in sewing capabilities. Sewing test conditions are summarized in Table 7.

TABLE 7

| | |
|---|---|
| Pressure Sealer | Aline HD-60 |
| Pressure Applied | 140 psi. |
| Temperature Range | 430-445 F. |
| Time Heated and Compressed | 5 seconds |
| Sewing Speed | 38 ft/min |
| CelluLiner Layers per Panel | 44 Layers |
| Kraft Paper Layers per Panel | 2 Layers |
| Total Layers per Panel | 46 Layers |
| Layer Dimensions | 5" × 4" |

Example 6: Puncture Point

The test determines the performance of the cellulosic material (heated/compressed & non-heated/non-compressed) in puncture point testing. Using a G0704 Grizzly industrial mill, a Everbilt ⁷⁄₁₆ in. plain ball bearing, and a 5"×4" structure composed of 88 layers of cellulosic material and 4 layers of kraft paper, the following data was gathered. The following demonstrates how much stronger a treated cellulosic material structure becomes compared to an untreated structure. The test utilizes an industrial mill, where a ball bearing is pressed onto the sewed seal until puncturing appears. Test conditions and results are summarized in Table 8.

TABLE 8

| Puncture Point Test | |
|---|---|
| Ball Bearing | Everbilt ⁷⁄₁₆ in. Plain |
| Industrial Mill | G0704 Grizzly |
| Pressure Reader | Woody's |
| Surface Kraft Paper Tear Point | 400 psi. |
| Heated/Compressed Tear Point | 640 psi. |
| Amount of Heated/Compressed Layers Torn (640 psi) | 47 layers |
| Unheated/Uncompressed Tear Point | 500 psi. |
| Amount of Unheated/Uncompressed Layers Torn (640 psi) | 92 layers |

To demonstrate the strengthened stitch, the layer structure can be prepared using two 46 layer structures where each structure is composed of 44 layers of 12.5 lb unbleached tissue that are covered on both sides by 1 layer of 30 lb unbleached paper; the two layers of this structure are heated and compressed along a 3/4" in. wide area along the 4 in. edge at a downward pressure of 140 psi. for 5 seconds with temperatures ranging from 430-445° F. using an Aline HD60 sealer. This structure is then sewn together using Ubond 200 twisted textured nylon thread manufactured by Ubond, on a FISCHBEIN Empress Series Model 100 that applies a chain stitch.

With the structure prepped, a G0704 Grizzly mill is used along with an Everbilt ⁷⁄₁₆ in. plain ball bearing. A pressure reader is placed under the layer structure with the ball bearing resting on the stitched portion of the structure. The mill head is then compressed onto the ball bearing. When testing an unheated and uncompressed structure, puncturing occurs at 500 psi. When the same structure is heated and compressed as outlined above, the structure does not puncture until 640 psi. At 640 psi., the heated and compressed structure has 47 layers of its structure punctured. The unheated and uncompressed structure has all 92 layers of its structure punctured.

Referring now to FIG. 1, shown is a stitch line on the back side of a cellulosic web, where 6 is the front surface of the web, 2a is the stitch line on the back side 1 is the side of the insulating panel, and 3 are the cellulosic tissues, for a relaxed and compressed web prior to sewing.

Figure 2:
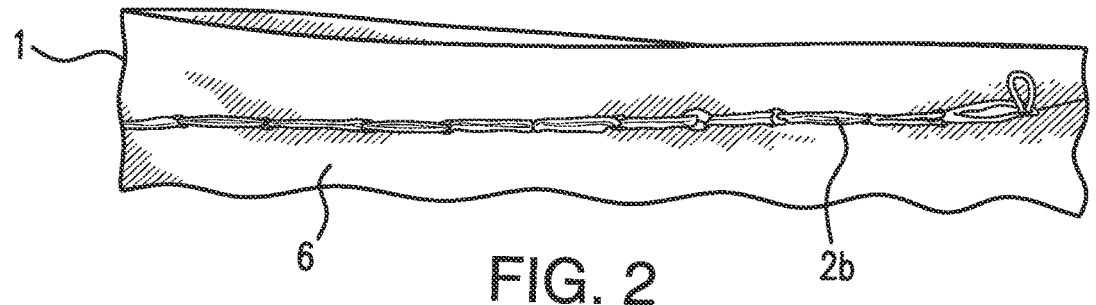
FIG. 2 shows a front-side stitch line for a cellulosic web that was relaxed & compressed.

Referring now to FIG. 2, shown is a stitch line on the front side of a cellulosic web, where 6 is the front surface of the web, 2b is the stitch line on the front side, 1 is the side of the insulating panel, and 3 are the cellulosic tissues, for a relaxed and compressed web prior to sewing.

Figure 3:
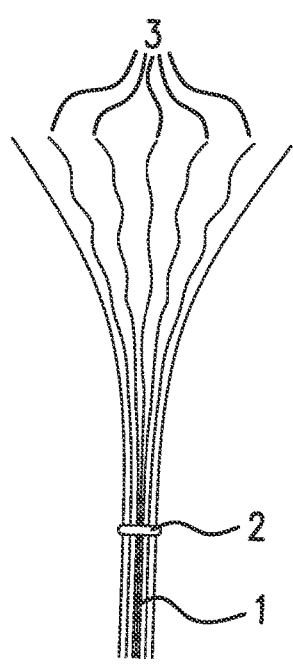
FIG. 3 shows a side view of a stitched cellulosic web.

Referring now to FIG. 3, shown is a side view of a cellulosic web that has been folded and stitched, where 3 are the cellulosic tissue layers, 2 is the stitch line and 1 is the side of the insulating panel.

Figure 4:
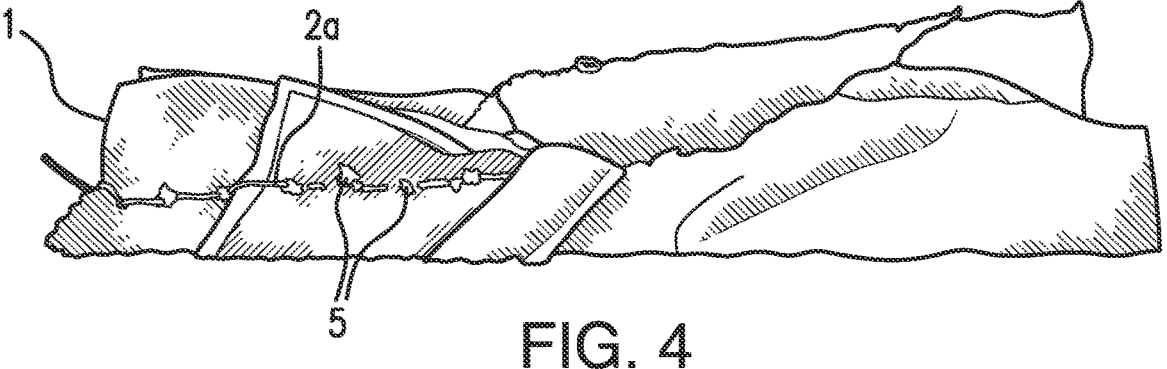
FIG. 4 shows a back side stitch line for cellulosic web that was not relaxed or compressed.

Referring now to FIG. 4, shown is a stitch line on the back side of a cellulosic web, where 2a is the stitch line on the back side of the web and 5 are tears, for a web that was not relaxed and compressed prior to sewing.

Figure 5:
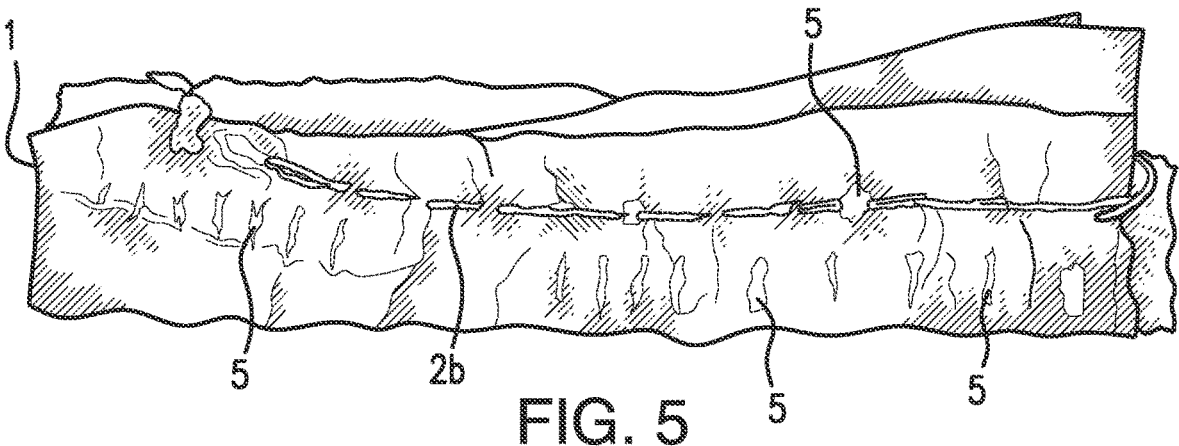
FIG. 5 shows a front side stitch line for cellulosic web that was not relaxed or compressed.

Referring now to FIG. 5, shown is a stitch line on the front side of a cellulosic web, where 2b is the stitch line on the front side and 5 are tears, and 1 is the side of the insulating panel, for a web that was not relaxed and compressed prior to sewing.

Figures 6, 7, 8, 9, 10:
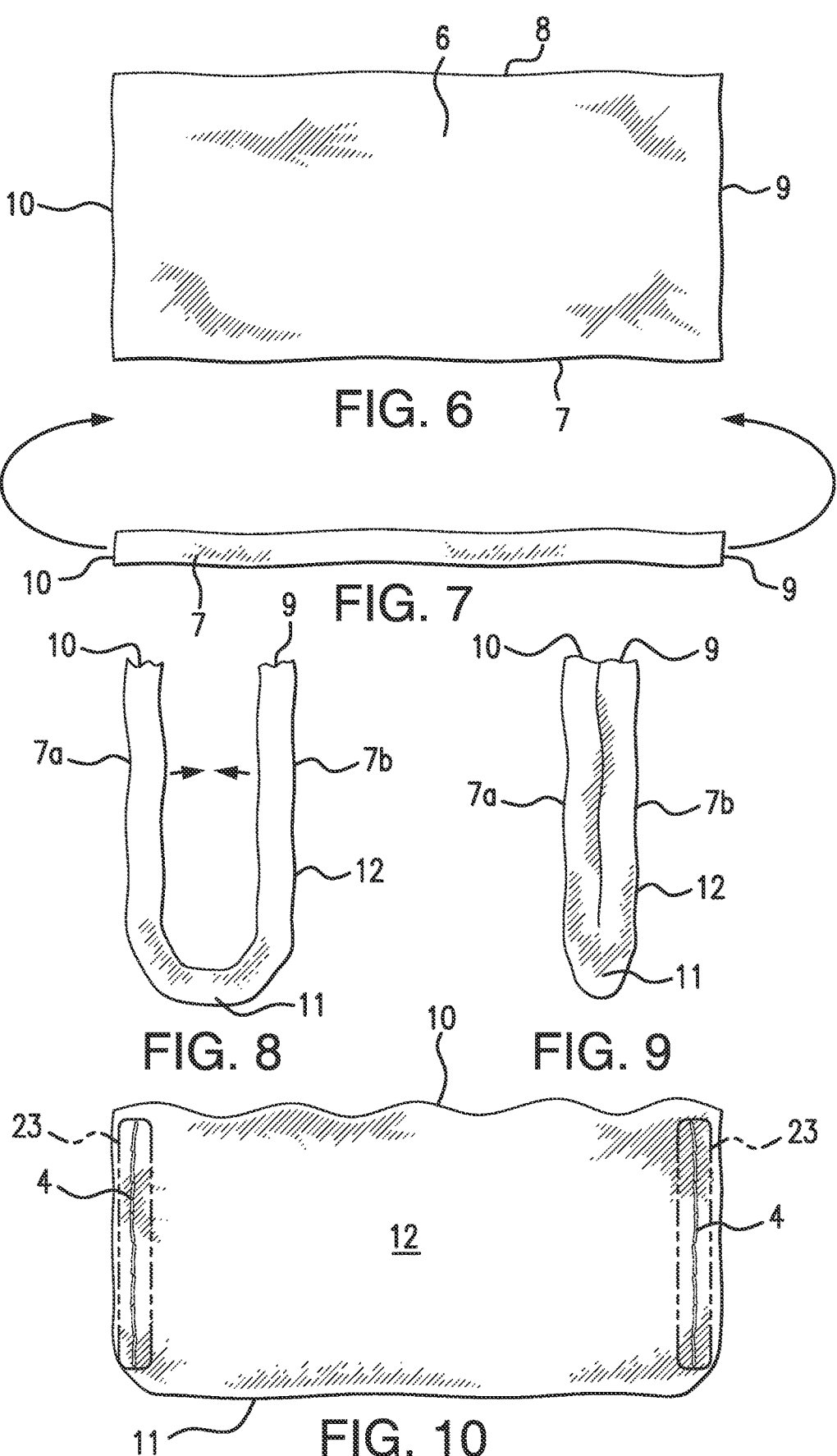
FIG. 6 shows an overhead view of a layer of cellulosic web.
FIG. 7 shows an edge view of the cellulosic web of FIG. 6.
FIG. 8 shows the edge view of the cellulosic web of FIG. 7 where two sides have been rotated up.
FIG. 9 shows the edge view of the cellulosic web of FIG. 8 where the sides have been pushed together so that they contact each other.
FIG. 10 shows the cellulosic web of FIG. 9 that has been stitched on two edges.

Referring now to FIG. 6, shown is a top view of a cellulosic web lying flat, where 6 is the side surface of the web having edges 7, 8, 9 and 10.

Referring now to FIG. 7, shown is side 7 edge view of the cellulosic web of FIG. 6, with edges 7, 9 and 10, where edges 9 and 10 are to be rotated up.

Referring now to FIG. 8, shown is an edge view of the cellulosic web of FIG. 7 where edges 9 and 10 have been rotated 90 degrees, 11 is the fold in the bottom of the web, 12 is the side surface of the web (opposite to side surface 6), and 7a and 7b are parallel edges of edge 7 after folding.

Referring now to FIG. 9, shown is the view of FIG. 8 where parallel edges 7a and 7b have been pushed inward, so that they contact one another thereby creating an edge portion where the webs can be connected.

Referring now to FIG. 10, shown are connected insulated panels which have been sewn after relaxation and compression. For example, in the case of the web of FIG. 9, the web has been rotated 90 degrees, relaxed and compressed in adjacent portion 23, and the resultant webs sewn along stitch lines 4.

Referring now to FIG. 11, shown is cellulosic web 20.

Referring now to FIG. 12, shown is cellulosic web 20 with double connection lines 21 after sewing.

Referring now to FIG. 13, shown is cellulosic web 20 after connection lines 21 have been cut between the double connection lines 21, creating free ends 22.

Figure 14:
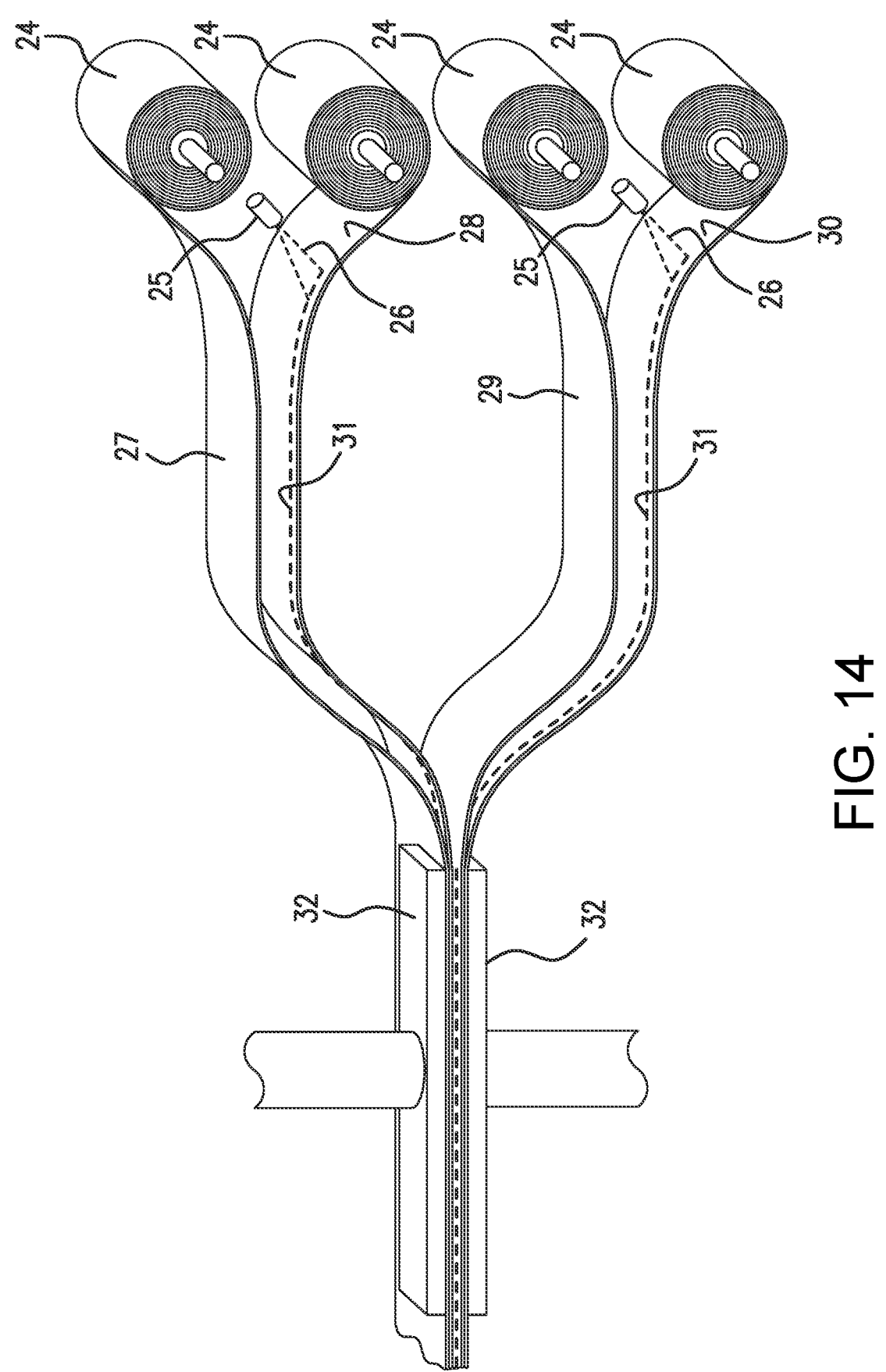
FIG. 14 illustrates adhesive being pre-applied to layers of cellulosic material as they are combined to facilitate connecting their edges.

Referring now to FIG. 14, shown is adhesive being pre-applied to layers of cellulosic material as they are combined to facilitate a connecting of the edges thereafter. Rolls 24 unwind layers 27, 28, 29, and 30 of cellulosic material such as kraft paper and multi-layer cellulose roll. Adhesive sprayers 25 spray adhesive 26 onto cellulosic material layers 28 and 30 to form a line of adhesive 31 near the edge of the layer. Heated compression bars 32 apply pressure to fasten layers 27 to 28 and 29 and 30 using the adhesive 26 along the adhesive lines 31. Alternatively, layers 27, 30 or both can be pre-applied with adhesive or cohesive materials. Layers 27, 28, 29 and 30 may each represent a structure comprising a multitude of cellulosic layers, covered on at least one layer with a less absorbent paper material. Preferably, the top most layer of 27 and the bottom most layer of 30, here represented as the top most and bottom most layers, extend beyond the edges of layers 28 and 29, and join one another to facilitate connection to each other and to facilitate a fastening of all four structures 27, 28, 29 and 30 together along their edges. Such a configuration is improved when layers 28 and 29 are cut to create a straighter edge so as to not interfere with the subsequent contact and closure of layers 27 and 30.

Figure 15:
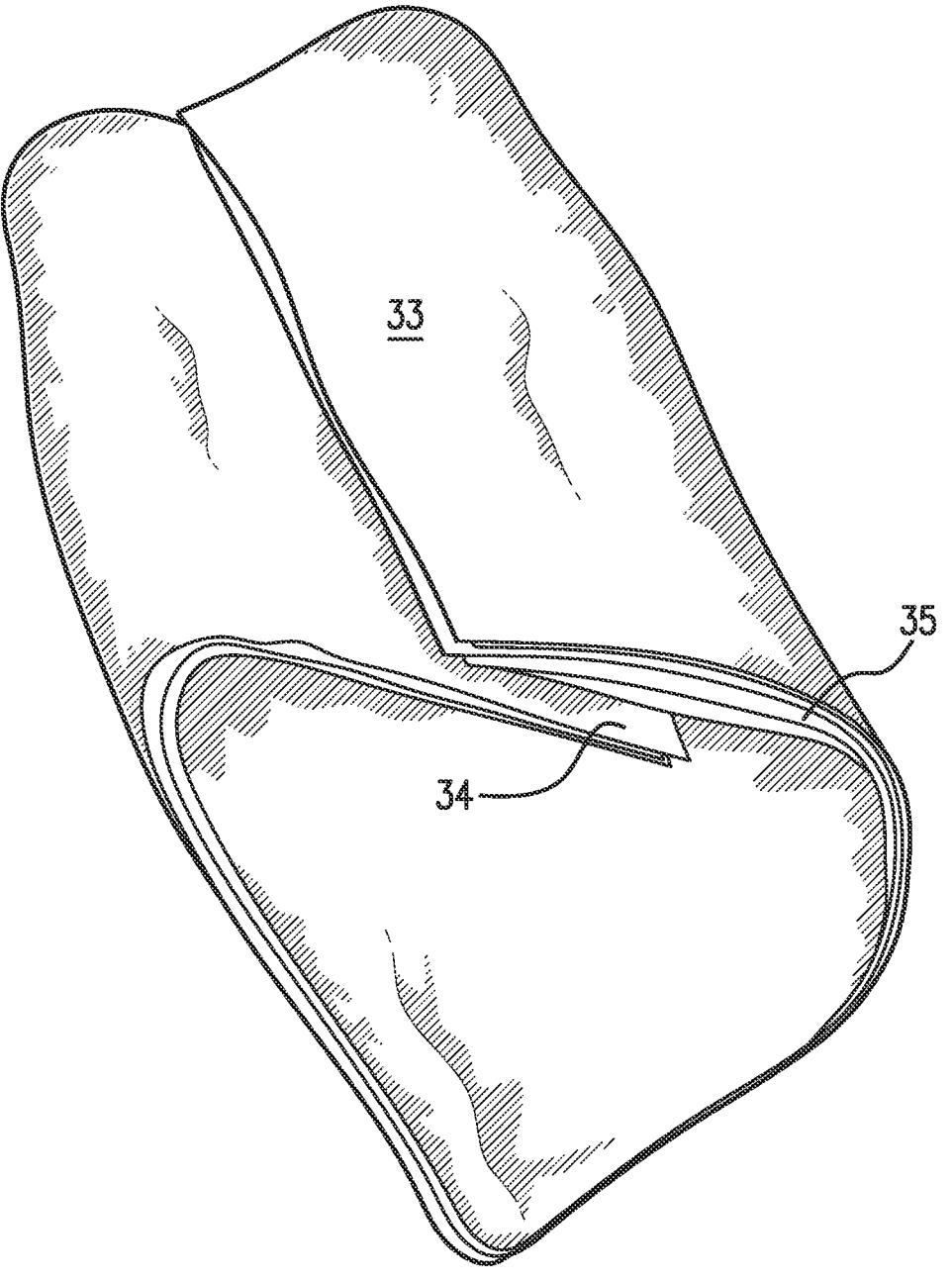
FIG. 15 illustrates a single cellulosic web wherein the edges are overlapped.

Referring now to FIG. 15, shown is a single cellulosic web that has been rolled over upon itself. Edge portions 33 and 34 overlap. Individual cellulosic fiber layers 35 are also shown.

Figure 16:
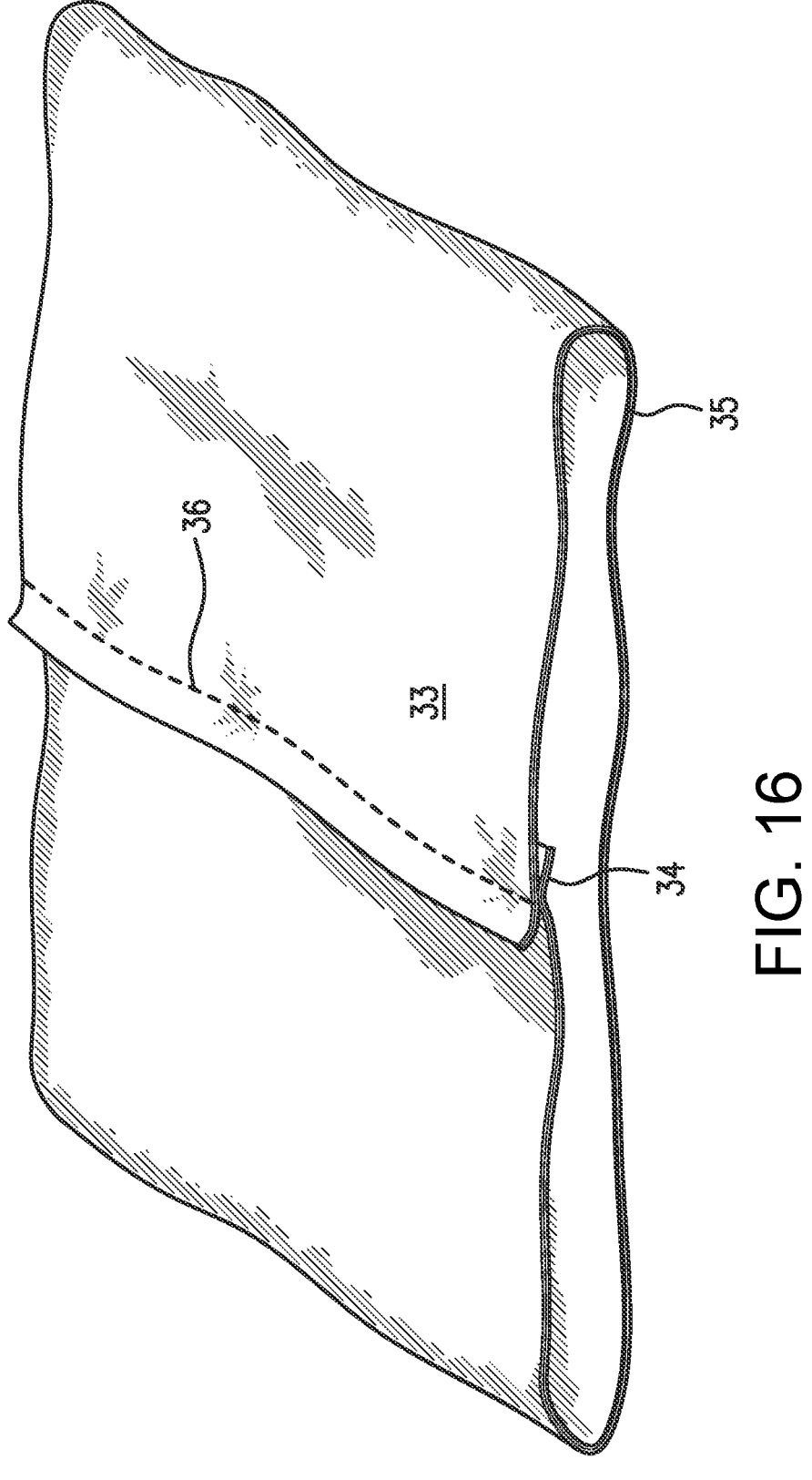
FIG. 16 illustrates the web of FIG. 15 connected along an overlapping edge.

Referring now to FIG. 16, shown is the cellulosic web of FIG. 15 where connection 36 has been applied in the overlapping region of edge portions 33 and 34. The top or bottom surface of edge portion 33 can also be used as a connection to the top or bottom surface of 34.

Figure 17:
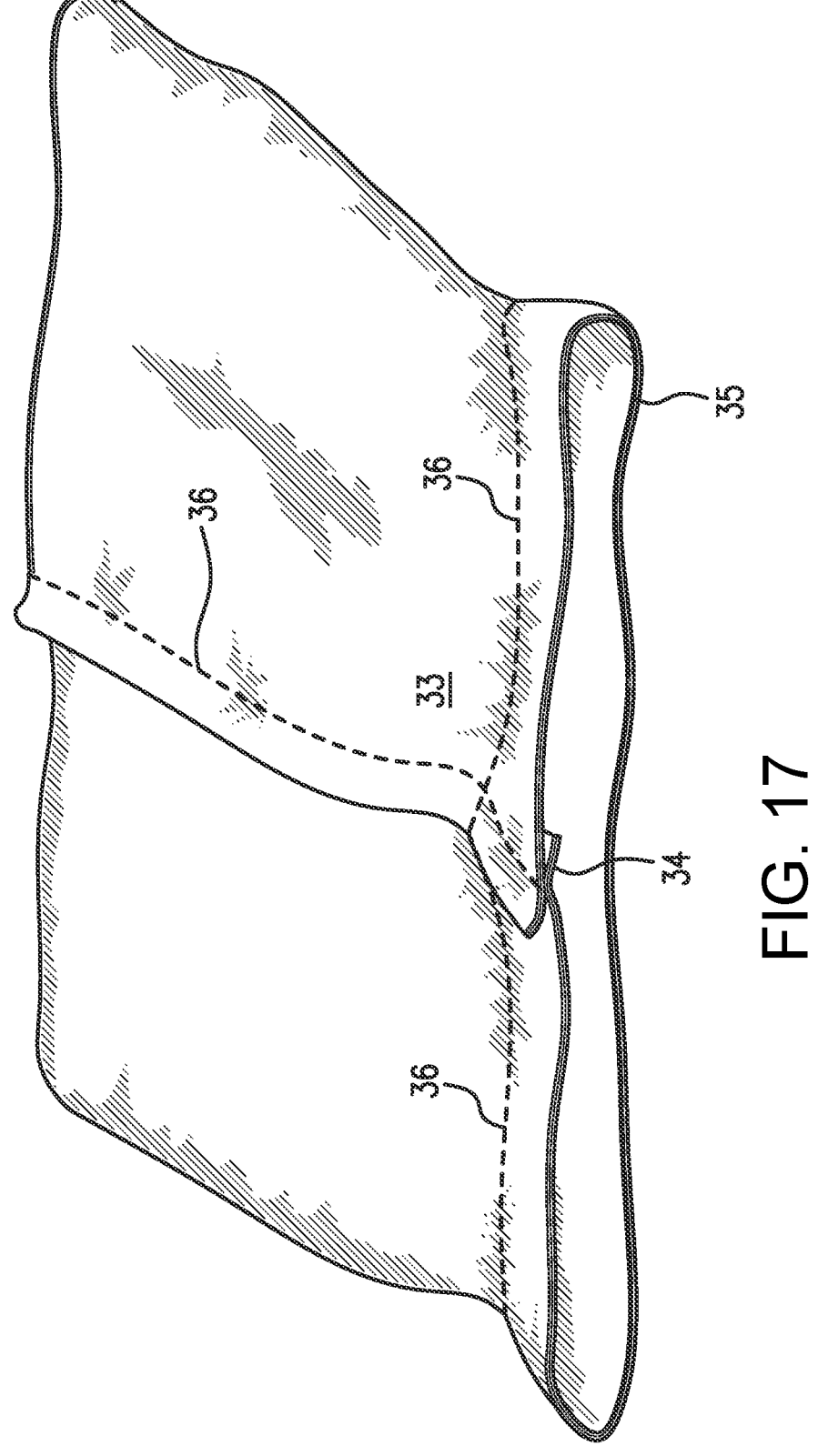
FIG. 17 illustrates the web of FIG. 16 connected along an open edge.

Referring now to FIG. 17, shown is web of FIG. 16 where a second connection 36 has been applied along one of the open ends. Individual cellulosic fibers 35 are also shown.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be affected without departing from the spirit and scope of the invention as described and claimed.

I claim:

1. A method for connecting insulation panels, each of the panels comprising a cellulosic web having two sides and an outside edge, and comprising layers of cellulosic fibers, the method comprising:

arranging a portion of each panel to be adjacent to the other, thereby forming an edge portion where the two webs can be connected;

compressing with mechanical pressure a relaxed fiber edge portion of each insulation panel at a pressure of from 5 to 50 psig, thereby forming a compressed panel portion having a thickness and a density; and fastening the compressed panel portions together.

2. A method for connecting insulation panels comprising two sides, an outside edge, and a total width, within an area ⅓ or less the distance of the total width from the outside edge, each of the panels comprising a cellulosic web comprising layers of cellulosic fibers, the method comprising:

a) arranging a portion of each panel to be adjacent to the other, thereby forming a connection portion where the two webs can be connected;

b) relaxing the fibers of cellulosic material in the connection portion of each insulation panel by moistening the cellulosic web in the connection portion to a level of 0.5 to 2 lb water/lb cellulosic web, thereby forming a relaxed connection portion;

c) compressing with mechanical pressure the relaxed connection portion of each insulation panel at a pressure of at least 5 psig, thereby forming a compressed panel portion having a thickness and a density; and d) fastening the compressed panel portions together using sewing, riveting, adhesive, tape, interlacing, stamping, ply bonding or stapling thereby forming a fastened area.

3. A method for connecting insulation panels comprising two sides, an outside edge, and a total width, within an area ⅓ or less the distance of the total width from the outside edge, each of the panels comprising a cellulosic web comprising layers of cellulosic fibers, the method comprising:

a) arranging a portion of each panel to be adjacent to the other, thereby forming a connection portion where the two webs can be connected;

(b) relaxing the fibers of cellulosic material in the connection portion of each insulation panel by moistening the cellulosic web in the connection portion, thereby forming a relaxed connection portion;

(c) compressing with mechanical pressure the relaxed connection portion of each insulation panel at a pressure of from 5 to 50 psig, thereby forming a compressed panel portion having a thickness and a density; and (d) fastening the compressed panel portions together using sewing, riveting, adhesive, tape, interlacing, stamping, ply bonding or stapling thereby forming a fastened area.

4. The method of claim 2 wherein the mechanical pressure is from 5-50 psig.

* * * * *